Sept. 2, 1969     E. J. BREWSTER ET AL     3,465,348
OSCILLOGRAPHIC APPARATUS FOR PRODUCING HALF-SCALE TIMING LINES
Filed April 29, 1968     2 Sheets-Sheet 1

INVENTORS
Elton J. Brewster
Jack J. Rousso
BY
Paul Van Slyke
*AGENT*

INVENTORS
Elton J. Brewster
Jack J. Rousso
BY
Paul Van Slyke
AGENT

United States Patent Office
3,465,348
Patented Sept. 2, 1969

3,465,348
OSCILLOGRAPHIC APPARATUS FOR PRODUCING HALF-SCALE TIMING LINES
Elton J. Brewster, Rockwall, and Jack J. Rousso, Dallas, Tex., assignors to Mobil Oil Corporation, a corporation of New York
Filed Apr. 29, 1968, Ser. No. 724,808
Int. Cl. G01d 9/02
U.S. Cl. 346—23     5 Claims

ABSTRACT OF THE DISCLOSURE

The specification discloses a technique for plotting directly a seismic record cross section or other oscillographic record in half-scale format. A novel apparatus is also described for recording half-scale timing lines coincident with the recording of data by means of the same tone wheel used for plotting full-scale timing lines. The timing signal derived from the tone wheel is electronically doubled in frequency so that timing lines are generated at twice full-scale rate.

Background of the invention

The present invention relates generally to oscillographic recording apparatus for producing half-scale timing lines, and specifically to seismographic apparatus for plotting half-scale timing lines on seismic record cross sections.

In the plotting of seismic record cross sections, it is customary to plot timing lines on the same recording medium coincident with the seismic data. The usual method of seismic plotting employs a recording drum on which is mounted a recording medium which is rotated past some type of recording element. Some seismic plotters employ a galvanometer which directs a light beam to expose a trace on the recording medium in accordance with a seismic signal. Other types of plotters employ a cathode ray beam which is deflected in accordance with a seismic signal to expose a trace on a recording medium.

The usual method for plotting timing lines on seismic record sections employs a raised tooth gear called a tone wheel which is attached to the recording drum so that it rotates at the same rate. This tone wheel and its associated circuitry generates timing pulses which occur at a repetition rate related to the spacing between the teeth on the tone wheel and the diameter of the tone wheel. The timing pulses are fed to some type of optical timing line generator which may incorporate a glow tube. The timing line generator is excited periodically to expose timing lines on the recording medium as the recording drum rotates.

The accepted standard of the seismic industry is to plot a timing line every multiple of 10 milliseconds with multiples of 100 and 1,000 milliseconds being weighted to indicate major time divisions. If a plotter has multiple drum speed options, such as the usual 7.5 or 5.0 inches per second, a separate tone wheel is desirable for generating the timing signal for each speed option.

In digital-to-analog playback systems having a data buffer memory, it is possible to plot seismic data directly on a recording medium in a half-section format. That is, the time base of the seismic signal may be contracted to one-half of its normal full-scale length. This may be done by converting the digital samples of the seismic signal to analog form at twice the normal sample rate. For example, if seismic data is recorded and processed with a 4 millisecond sample interval, the data is programmed to be converted to analog form at 2 millisecond readout rate. If the recording drum continues to rotate at the same speed for a normally full-scale plot, the data converted to analog form at twice normal sample rate will be plotted in one-half of the normal time scale on the recording medium. Of course, it is possible to record the seismic cross section in normal full scale and later photographically reduce the cross section to a half-scale size. However, by producing a half-scale plot at the time of plotting, accuracy is improved and the manpower and equipment required to photographically reduce the full-scale cross section is correspondingly reduced.

If seismic data is read out at twice normal rate to produce a half-scale plot, the timing lines produced by the ordinary tone wheel still occur at the same time separation, even though the scale of the data has been reduced by one-half. Thus, where the timing lines are plotted every 10 milliseconds for full-scale, each timing line represents 20 milliseconds for half-scale data.

Summary of the invention

The objects of the present invention are:
(1) To provide a novel and improved means of producing half-scale timing lines;
(2) To eliminate the need for a separate mechanical tone wheel for generating half-scale timing lines for each plotter speed option;
(3) To eliminate the shutdown time which would be required to install a mechanical tone wheel for generating half-scale timing lines in an operating plotter system; and,
(4) To permit the plotting of half-scale timing lines in existing plotting systems which have insufficient space for the attachment of additional tone wheels.

These objects are achieved by providing electronic means to double the frequency of the timing signal derived from tone wheel for each speed option. The frequency doubled timing signal is then fed to the optical timing line generator so that timing lines are produced at twice normal rate.

Doubling the frequency of the low frequency timing signal derived from the standard tone wheel presents a difficult problem not solvable by conventional frequency doubling techniques, particularly where the timing signal is nonsymmetrical. Thus, by another feature of the invention there is provided a novel means of doubling the frequency of the basic time signal. A nonsymmetrical square wave train derived from the standard tone wheel and its associated circuitry is fed to a delay circuit and delayed for one-half cycle. The input square wave train and the delayed square wave train are then differentiated to obtain a positive-going and negative-going spike from each cycle of the two wave trains. The two differentiated wave trains are then summed and rectified to obtain a pulse train having a repetition rate twice that of the original input square wave train. The spike pulses which are derived from the delayed input square wave train is actually inserted between adjacent spike pulses derived from the original and undelayed input square wave.

Detailed description

Figure 1:
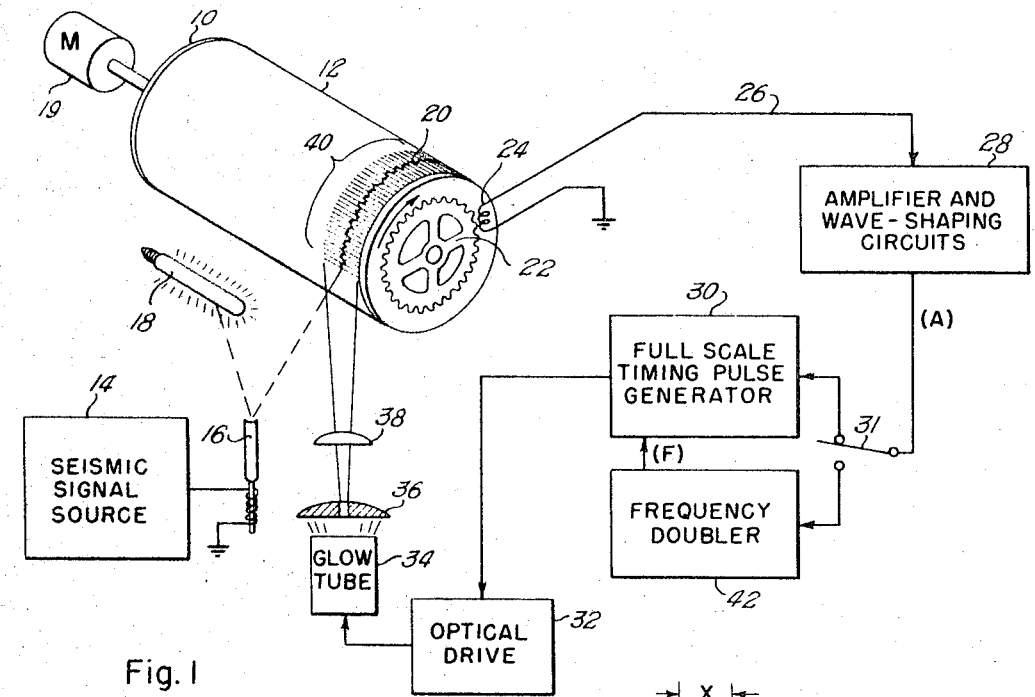
FIGURE 1 is a schematic diagram of one form of the invention shown with galvanometer type plotting apparatus.

Referring to FIGURE 1, there will now be described in detail one form of the invention used with a galvanometer type plotting system. The system illustrated includes a recording drum 10 supporting a recording medium 12 and a mirror galvanometer 16. A seismic signal source 14 supplies an electrical signal to energize the coil of mirror galvanometer 16 which reflects a light beam from light source 18 to the recording medium 12.

In the plotting of a seismic record, the recording drum 10 is rotated at a constant rate by means including an electric motor 19 at a speed corresponding with full-scale recording of the seismic signal from source 14. Thus, as the recording drum 10 rotates, the modulated light beam reflected by mirror galvanometer 16 exposes on the recording medium 12 a trace indicated diagrammatically at 20. In actual practice, of course, the recording medium would be located within light-tight housing and the exposure of a trace would become visible to the eye only upon subsequent processing.

The plotting system shown in FIGURE 1 has a raised tooth gear or tone wheel 22 attached to and rotating with recording drum 10. A magnetic reluctance pickup 24 is positioned adjacent the periphery of tone wheel 22. As the teeth of tone wheel 22 pass beneath pickup 24, an electrical timing signal is generated on conductor 26. The diameter of tone wheel 22 and the spacing between its teeth are chosen such that the timing signal generated by pickup 24 has a frequency proportional to the time separation desired for the timing lines to be plotted coincident with the recording of trace 20.

The timing signal appearing on conductor 26 is applied to certain amplifier and wave-shaping circuits 28. The timing signal appearing on conductor 26 may be in a sinusoidal form, but is converted by circuitry 28 into a nonsymmetrical square wave as shown by waveform (A) of FIGURE 3.

The timing signal from circuit 28 is fed to a timing pulse generator 30 through a switch 31. Timing pulse generator 30 is illustrated to be of the type for producing full-scale timing pulses suitable for driving an optical timing line generator. Generator 30 includes the conventional counter and mixing circuitry required to produce weighted timing lines at major time division.

An optical timing line generator is illustrated as including an optical drive circuit 32, a glow tube 34, an aperture device 36, and a lens system 38. The timing pulses from the output of timing pulse generator 30 are applied to optical drive circuit 32 which excites glow tube 34 to generate bursts of light at a repetition rate corresponding with the repetition rate of the timing pulses from generator 30. The light from glow tube 34 passes through an aperture in aperture device 36 and then through lens system 38 to expose timing lines 40 on recording medium 12 in coincidence with the plotting of trace 20.

When half-scale plotting of seismic data is desired, the signal source 14 is programmed to supply the electrical seismic signal to mirror galvanometer 16 at double the full-scale time base rate. With the recording drum 10 rotating at its normal full-scale rate, the trace 20 exposed by the light from mirror galvanometer 16 is contracted along its time base by half scale.

In accordance with the present invention, the standard tone wheel 22 may be used to generate half-scale timing lines which are coincident with the half-scale plotted trace. More specifically, when half-scale timing lines are desired to be generated, switch 31 is thrown to the position such that the output from circuit 28 is applied to the input of a frequency doubler circuit 42. Frequency doubler circuit 42 doubles the repetition rate of the timing pulses derived from the standard tone wheel 22. The doubled repetition rate pulses from the output of frequency doubler 42 are applied to the mixing and counting circuitry in the full-scale timing pulse generator 30 that provides for weighting of timing lines at major time divisions. The half-scale timing lines are then generated in the conventional manner by the optical timing line generator including the glow tube 34.

The plotting hardware and circuitry indicated schematically in FIGURE 1, with the exception of frequency doubler 42, may be a commercially available unit designated as MS–600, available from Southwestern Industrial Electronics, Houston, Tex. The timing pulse generator 30 is designated specifically as the TLG–15D available from the same manufacturer.

An example of a digital-to-analog playback system which is capable of readout at twice normal sample rate is the TIDAR, series 100, available from Texas Instruments, Inc., Dallas, Tex.

The present invention is also useful for other types of plotting systems, besides those using galvanometers. For example, it may be used in the cathode ray tube plotting system designated MEC–630 available from the Geospace Corporation, Houston, Tex. In the case of a cathode ray tube plotter, the doubled timing signal is fed to the cathode ray beam-controlling circuitry.

Figure 2:
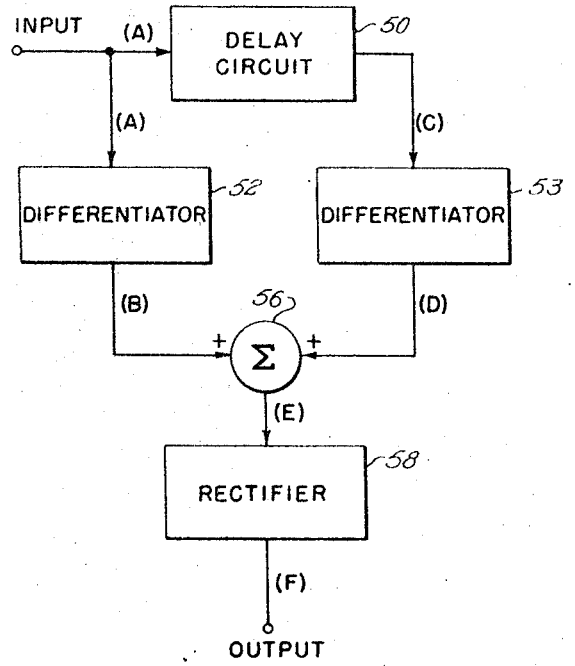
FIGURE 2 is a functional block diagram of a novel electronic frequency doubling means.
Figure 3:
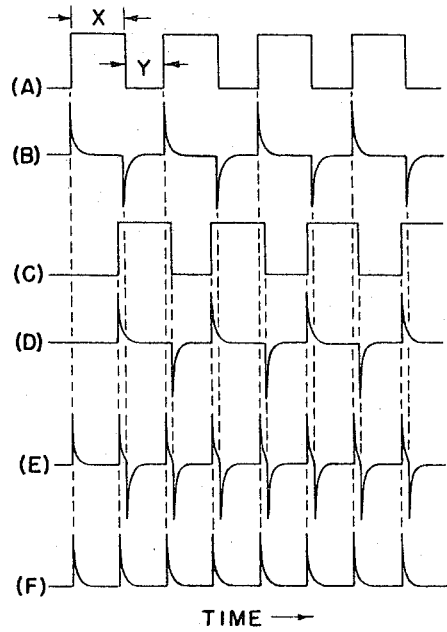
FIGURE 3 illustrates waveforms which appear at the corresponding lettered points in the diagram of FIGURE 2.

Referring to FIGURES 2 and 3, there will now be described the functional operation of a novel frequency doubler circuit. The wave train A from the output from circuit 28 of FIGURE 1 is shown to be nonsymmetrical; i.e., the period X is not equal to the period Y.

The nonsymmetrical wave train A is fed to a delay circuit 50 where it is delayed by one-half cycle to obtain the waveform C. Both the delayed waveform C and the original input square wave A are then differentiated in differentiator circuits 52 and 53 to obtain waveforms B and D. The differentiated waveforms B and D include one positive and one negative spike from each cycle of the square waves A and C. The differentiated waveforms B and D are then applied to a summing network 56 to produce the combined waveform E which is rectified in rectifier 58 to produce the output waveform F.

As can be seen by waveform F, a positive spike pulse is obtained from the leading edge of each pulse in a cycle of input wave A. A spike pulse is inserted between each of the pulses derived from the leading edge of the input square wave A. This inserted pulse is derived by the differentiation of the leading edge of the delayed square wave C.

Figure 4:
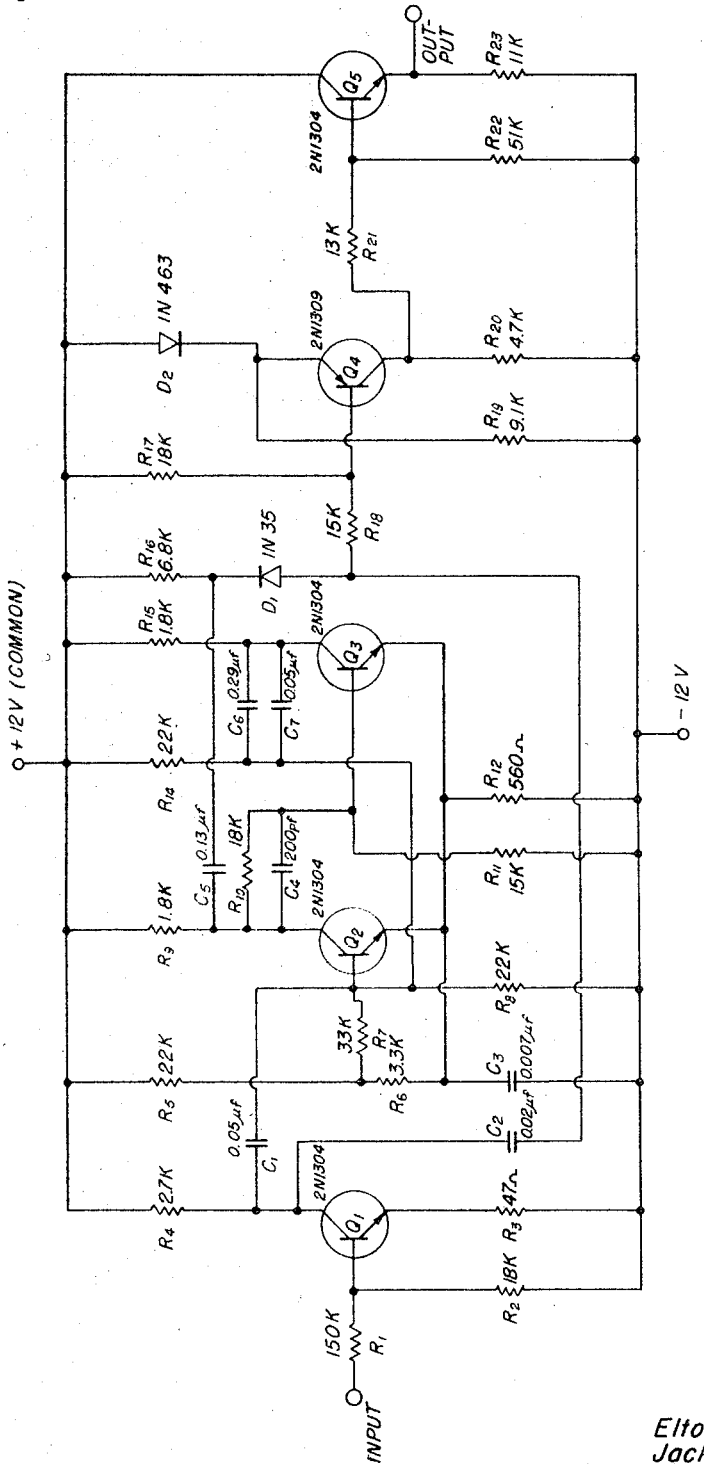
FIGURE 4 is a design example of a circuit schematic for the block diagram of FIGURE 2.

Referring to FIGURE 4, there will now be described a design example of a circuit schematic for the block diagram of FIGURE 2. Component values and types are shown in FIGURE 4 purely for illustrative purposes and are not intended to be limiting on the scope of the invention. The values of resistance are given in ohms ($\Omega$), where K represents 1,000 ohms. The values of capacitance are given in microfarads ($\mu f.$) where the designation pf represents microfarads.

The schematic of FIGURE 4 includes an input buffer stage comprising transistor $Q_1$, a monostable multivibrator stage including transistors $Q_2$ and $Q_3$, a summation and rectifier stage including transistor $Q_4$, and an emitter follower stage including transistor $Q_5$.

The input signal (waveform A of FIGURE 3) is applied through resistor $R_1$ to the base of transistor $Q_1$ where it is inverted and then differentiated by the network including capacitor $C_1$ to produce a series of positive and negative spikes. The negative spikes are coupled through capacitor $C_1$ to trigger the monostable multivibrator including transistors $Q_2$ and $Q_3$. In the quiescent state, transistor $Q_3$ is nonconducting and transistor $Q_2$ is conducting. Upon being triggered by the negative-going spikes coupled through capacitor $C_1$, transistor $Q_2$ becomes nonconducting for a period determined by the RC time constant of the network between the collector of $Q_3$ and the base of $Q_2$. This RC time constant is set to equal one-half cycle of the input signal, for example, 5 milliseconds. After being triggered, the monostable multivibrator produces a delayed square wave which is differentiated by the network including capacitor $C_5$ and coupled through blocking diode $D_1$ into a summing resistor $R_{18}$.

The inverted input signal from output of transistor $Q_1$ is also differentiated by the network including capacitor $C_2$ and applied to the summing resistor $R_{18}$. Thus, there appears across resistor $R_{18}$ the summation waveform shown at E in FIGURE 3.

The summation waveform across resistor $R_{18}$ is applied to the rectifier stage including transistor $Q_4$. Transistor $Q_4$ is normally maintained biased to cutoff. Only the negative-going voltage spikes from summing resistor $R_{18}$ cause transistor $Q_4$ to conduct; the positive-going spikes tend to bias transistor $Q_4$ further to cutoff. The negative-going voltage spikes applied to the base of transistor $Q_4$ cause a positive voltage rise at its collector which is applied through resistor $R_{21}$ to the emitter follower stage including transistor $Q_5$. The output signal is taken from the emitter of transistor $Q_5$ for direct input into the further circuitry in the timing pulse generator 30 of FIGURE 1.

Now that several forms of the invention have been described and illustrated, it will be apparent that certain other modifications may be made still within the true spirit and scope of the invention.

The invention claimed is:

1. Oscillographic recording apparatus comprising:
   (a) a recording drum adapted to support a recording medium;
   (b) means for rotating said recording drum at a speed corresponding with full-scale recording of an oscillographic signal;
   (c) timing pulse generator means including a tone wheel attached to said recording drum for generating a timing signal having a frequency corresponding to full-scale recording of the oscillographic signal;
   (d) an optical timing line generator adapted to produce timing lines on a recording medium on said recording drum; and
   (e) electronic means coupled to said timing pulse generator means and to said optical timing line generator for doubling the frequency of said timing signal, whereby said optical timing line generator is driven to produce timing lines at double full-scale rate corresponding to half-scale.

2. The apparatus defined by claim 1 wherein said electronic means comprises:
   (a) a delay circuit coupled to said timing pulse generator means for delaying said timing signal one-half cycle;
   (b) a first differentiator circuit coupled to the output of said delay circuit;
   (c) a second differentiator circuit coupled to said timing pulse generator means for differentiating said timing signal; and
   (d) a network coupled to the output of both of said differentiator circuits for summing and rectifying the differentiated output to produce a pulse train having a frequency double that of said timing signal.

3. Seismographic recording apparatus comprising:
   (a) a recording drum adapted to support a recording medium;
   (b) means for rotating said recording medium at a speed corresponding with full-scale recording of a seismic signal;
   (c) timing pulse generator means including a tone wheel attached to said recording medium for generating a nonsymmetrical square wave train having a frequency corresponding to full-scale recording of the seismic signal;
   (d) an optical timing line generator adapted to produce timing lines on a recording medium on said recording drum; and,
   (e) electronic means coupled to said timing pulse generator and to said optical timing line generator for doubling the frequency of said nonsymmetrical square wave train so that said timing line generator produces half-scale timing lines, said electronic means comprising:
      a delay circuit coupled to said timing pulse generator for delaying said nonsymmetrical square wave train for one-half cycle;
      a first differentiator circuit coupled to the output of said delay circuit;
      a second differentiator circuit coupled to the output of said timing pulse generator means for differentiating said nonsymmetrical square wave train; and
      a network coupled to the output of both said differentiator circuits summing and rectifying the differentiated output to produce a pulse train having a frequency double that of said nonsymmetrical square wave train.

4. The apparatus defined by claim 3 wherein said electronic means comprises:
   (a) a transistor input buffer stage;
   (b) a monostable multivibrator stage including a pair of transistors, the output of said input buffer stage being coupled to the trigger input of said monostable multivibrator stage, the time constant of said monostable multivibrator stage being adjusted to equal one-half cycle of said nonsymmetrical square wave train;
   (c) a summation and rectifier stage including a transistor normally biased to cutoff;
   (d) a first differentiator network coupled between the output of said input buffer stage and the input of said summation and rectifier stage;
   (e) a second differentiator network coupled between the output of said monostable multivibrator stage and the input of said summation and rectifier stage; and
   (f) an output buffer stage including a transistor connected in emitter follower configuration coupled to the output of said summation and rectifier stage.

5. Seismographic recording apparatus comprising:
   (a) a recording drum adapted to support a recording medium;
   (b) means for rotating said recording drum at a speed corresponding with full-scale recording of a seismic signal;
   (c) means for recording a seismic signal on a recording medium on said recording drum;
   (d) means for supplying a seismic signal to said recording means at a rate twice that normally associated with the recording drum speed, whereby said seismic signal may be recorded on the recording medium in half-scale format;
   (e) timing pulse generator means including a tone wheel attached to said recording drum for generating a timing signal having a frequency corresponding to full-scale recording of the seismic signal;
   (f) an optical timing line generator adapted to produce timing lines on a recording medium on said recording drum; and
   (g) electronic means coupled to said timing pulse generator means and said optical timing line generator for doubling the frequency of said nonsymmetrical square wave train so that said optical timing line generator produces half scale timing lines.

(References on following page)

References Cited

UNITED STATES PATENTS

| | | | |
|---|---|---|---|
| 2,496,392 | 2/1950 | Hasbrook | 346—23 |
| 3,187,336 | 6/1965 | Montgomery | 346—109 |

OTHER REFERENCES

Ice, W. E.: "Pulse Frequency Control," IBM Technical Disclosure Bulletin, vol. 9, No. 11, April 1967, pp. 1539–1540.

JOSEPH W. HARTARY, Primary Examiner

U.S. Cl. X.R.

307—225; 340—15.5; 346—108